3,156,822
INDUCED GAMMA RAY LOGGING AT A PLURALITY OF LEVELS IN A WELL BORE
Jay Tittman, Danbury, Conn., assignor to Schlumberger Well Surveying Corporation, Houston, Tex., a corporation of Texas
Filed Nov. 20, 1959, Ser. No. 854,490
10 Claims. (Cl. 250—83.3)

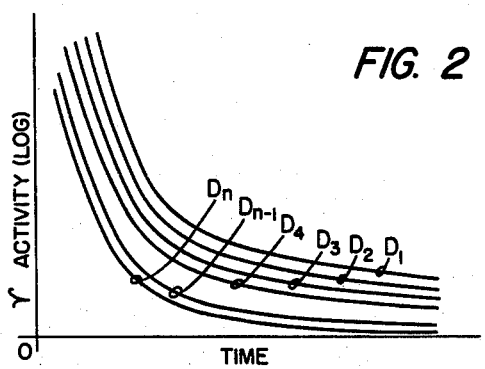
FIG. 2
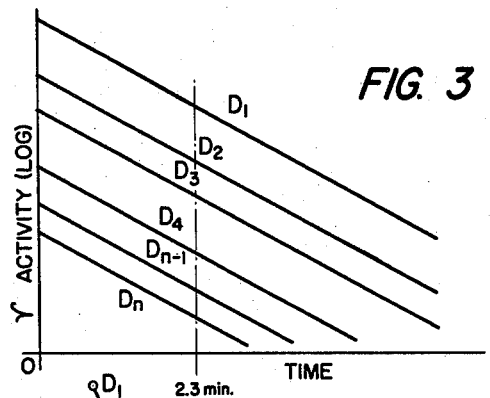
FIG. 3
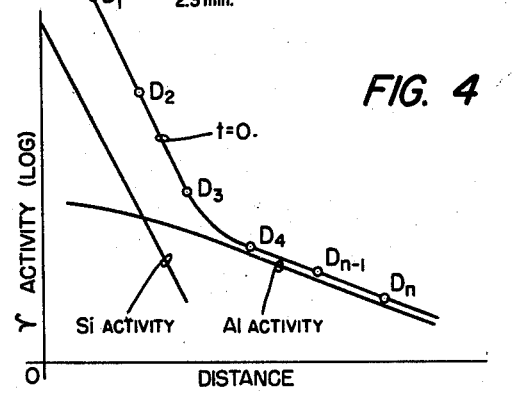
FIG. 4
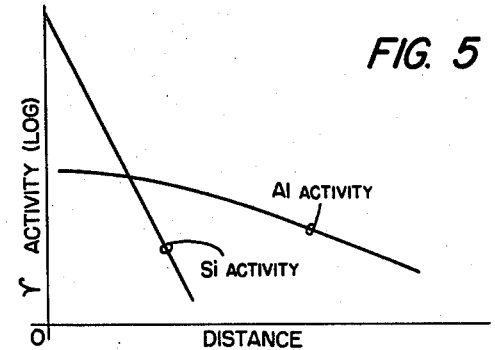
FIG. 5
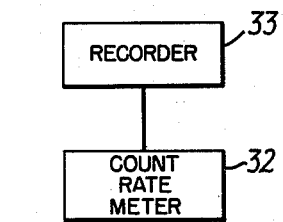
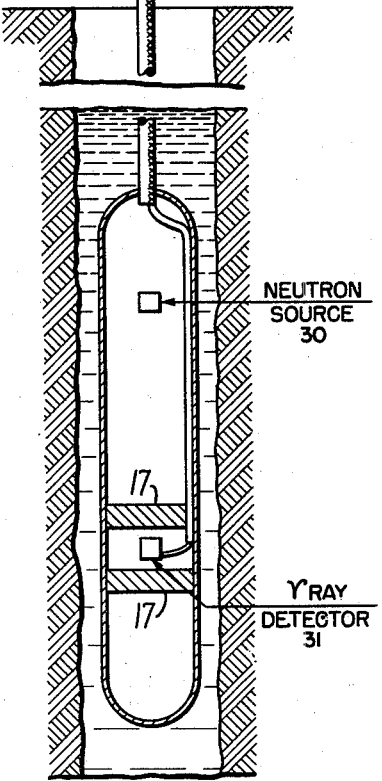
FIG. 6
INVENTOR.
JAY TITTMAN

This invention relates to methods and apparatus for investigating the earth formations traversed by a bore and, more particularly, to methods and apparatus which include bombarding the earth formations with neutrons and observing the nuclear processes produced thereby.

It is well known that the atoms of certain materials, when bombarded by neutrons, are able to capture these neutrons and produce radioisotopes. These radioisotopes, being unstable, gradually revert to a stable condition at a rate that is characterized by their half-life, with certain of the atoms emitting one or more gamma-ray photons when they revert.

The use of this phenomenon has been suggested as a means for identifying the various materials making up a formation and for determining the quantity of each. This is usually accomplished by bombarding the formation with neutrons and later following the resulting gamma-ray activity over a time period that is at least a substantial fraction of the half-life of the expected activity. The gamma-ray activities associated with the various materials are then separated, and the quantity of each material is determined by the intensity of the gamma-ray activity.

This method of identifying materials provides substantially accurate results provided the gamma-ray activities connected with the different materials are capable of being separated. Two activities can be separated very easily if the activities have widely separated half-life characteristics. There are instances, however, where the bombardment by neutrons of two materials produces two radioisotopes having substantially the same half-lives and, in fact, there are instances where exactly the same radioisotope is produced from two different materials. For example, both $Al^{27}$ and $Si^{28}$ react with neutrons and produce $Al^{28}$ which has a half-life of 2.3 minutes. It is apparent that an attempt, by ordinary methods and apparatus, to determine the amount of silicon and aluminum in a formation by bombarding the formation with neutrons would fail because the gamma-ray activity resulting when the $Al^{28}$ atoms revert to their stable condition could not be separated into the components that are due to aluminum and silicon.

Accordingly, it is the purpose of the invention to provide methods and apparatus for determining the relative amounts of two different materials which, when bombarded by neutrons, produce either exactly the same radioisotope or two different radioisotopes having substantially the same half-life.

This is accomplished by providing apparatus and methods for bombarding with relatively fast neutrons the earth formation surrounding a level in a bore to produce radioisotopes of the materials making up the formation and then detecting the resulting gamma-ray activity at a plurality of levels in the bore longitudinally spaced from the level of bombardment by distances such that the gamma-ray activities involving the different materials may be distinguished.

During bombardment by relatively fast neutrons different spatial distributions in the formation exist for the fast neutrons and for the thermal neutrons produced in the formation as a consequence of moderation of the fast neutrons. When the same radioisotope is produced from two different materials, as in the aforementioned example, one of the materials reacts with fast neutrons and the other of the materials reacts with thermal neutrons. Since the fast and thermal neutrons have different spatial distributions, it is possible, by properly positioning the gamma-ray detectors, to distinguish between the gamma-ray activities involving the two different materials.

The invention may be more completely understood from the following detailed description taken in conjunction with the accompanying figures of the drawings in which:

FIGS. 2 to 5 are graphs illustrating the operation of the apparatus shown in FIG. 1; and FIG. 6 is a schematic diagram of an alternate embodiment of the invention.

Figure 1:
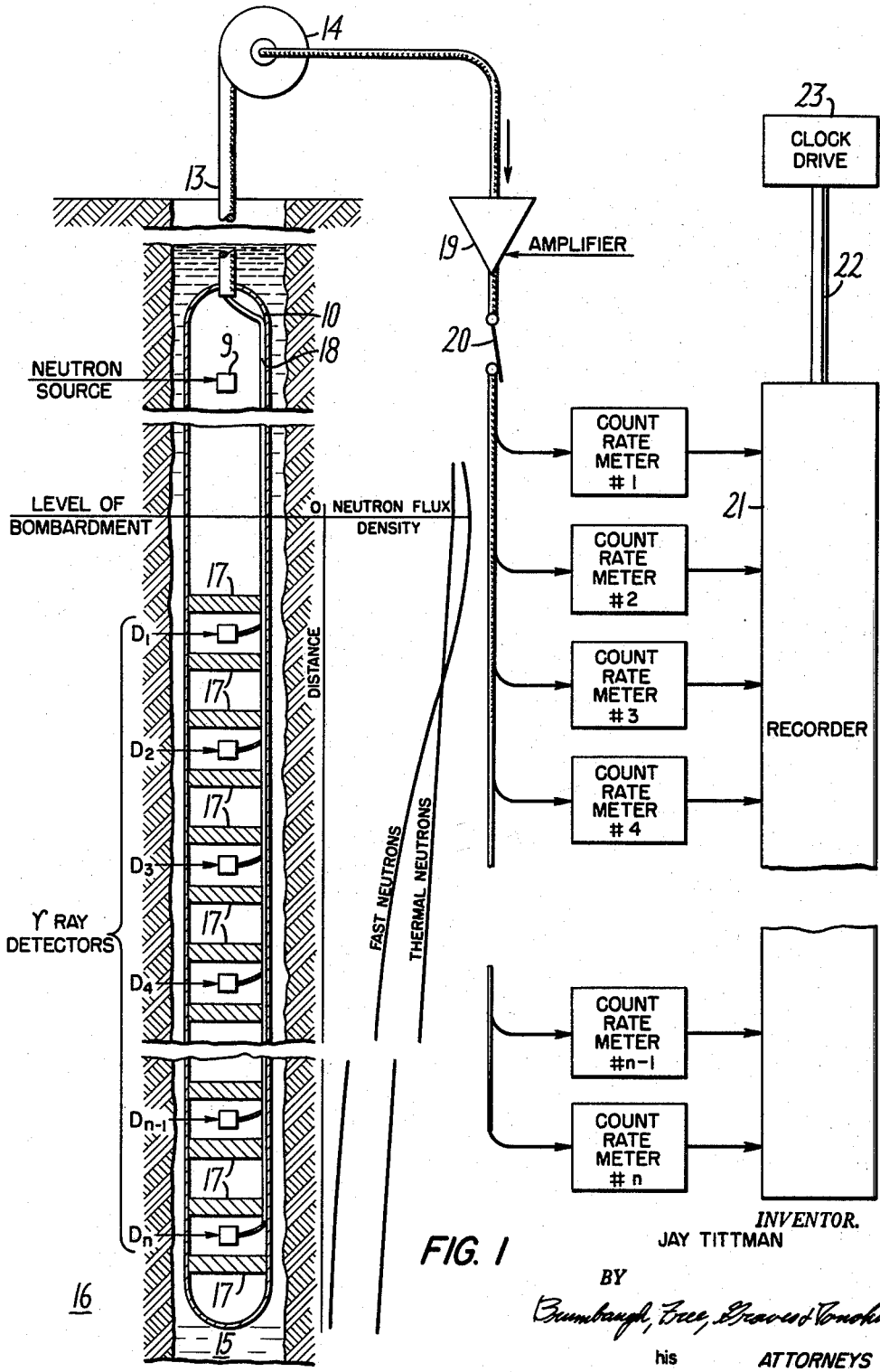
FIGURE 1 is a schematic diagram of an apparatus constructed in accordance with the invention for investigating the formations traversed by a bore.

While the operation of the invention is illustrated and explained in conjunction with its application to investigating the earth formations traversed by a bore, it should be understood that the invention is not restricted in its use thereto but can be used to investigate various materials under other circumstances.

With reference to FIG. 1, a support 10 is adapted to be lowered by a cable 13 and a conventional winch 14 into a bore 15 surrounded by earth formations 16 and containing a bore fluid. Carried by the support 10 are a neutron source 9 and a plurality of gamma-ray detectors $D_1$ to $D_n$, each of which is disposed between gamma-ray shields 17. The gamma-ray shields are disposed immediately above and below the gamma-ray detectors so that only gamma-ray photons entering the bore at points adjacent the detectors will impinge on the detectors. The gamma-ray detectors may be conventional types such as Geiger-Müller counters or scintillation crystal detectors, and the gamma-ray shields 17 may be lead, tungsten, or one of the dense alloys commonly used for shielding purposes. The neutron source 9 may be any one of the commercially available types such as Ra-Be, Po-Be, or D-T, which will provide both fast and thermal neutrons in its intended environment during operation in the bore.

The gamma-ray detectors $D_1-D_n$ are electrically connected by a plurality of conductors 18 contained within the supporting cable 13 and insulated therefrom to electrical apparatus at the surface of the ground. This electrical apparatus may include an amplifier 19, a switch 20, a plurality of count rate meters Nos. 1 to $n$ and a recorder 21. The recorder is driven by a shaft 22 and a clock drive 23 chosen appropriately for the decay time constant of the activity being measured.

The detectors $D_1$ to $D_n$ are connected to the count rate meters Nos. 1 to $n$, respectively. The meters are conventional in design and include means for making continuous measurements in counts per second of the gamma-ray photons impinging on the detectors. These measurements, which may be made for approximately the half-life of the expected activity, are sent to the recorder 21 in the form of electrical signals which operate mechanisms for recording these measurements in a conventional manner on graph paper (not shown). The recorder 21 may be operated in such manner that a plurality of curves are produced showing the number, in counts per second, of gamma-ray photons impinging on each of the gamma-ray detectors per unit of time. These curves may be plotted on separate graphs or on the same graph as shown in FIG. 2, the gamma-ray activity preferably being plotted on a log scale.

In operation, the neutron source is initially positioned at the level of bombardment indicated in FIG. 1 and the earth formations are bombarded for a predetermined length of time, which is preferably approximately equal to the half-life of the expected activity. At least a substantial number of the neutrons emitted by the neutron sources of the types previously described are relatively high energy neutrons. For example, the neutrons from a low voltage D-T source are closely monoenergetic at 14 m.e.v., while the energies of the Ra-Be neutrons and Po-Be neutrons have broad emission spectra with an appreciable fraction of these neutrons being at energies above 3.9 m.e.v.

Some of the neutrons emitted are slowed down by the fluid in the bore, which acts as a moderator, but many of the neutrons entering the earth formations have energies greater than 3.9 m.e.v. A portion of the neutrons entering the formations will react with nuclei wherein the induced activity is initiated by neutrons having relatively high energies. Other neutrons will not be captured immediately but will lose most of their energy by elastic and inelastic collisions with atoms in the formations. After these neutrons have been reduced to thermal neutrons, which have energies on the order of .025 e.v., they are captured by other nuclei which may then also become artificially radioactive.

It can be seen that the flux density of the high energy neutrons is greatest near the level of bombardment and decreases rapidly with distance from the source, because they cannot travel far without either reacting with nuclei or being slowed down. Likewise, the thermal neutron flux density is greatest near the level of bambardment and decreases as a function of the distance from this level. It does not decrease as rapidly as the fast neutron flux density, however, because some of the fast neutrons are converted to thermal neutrons by collisions with atoms.

The graph shown in FIG. 1 generally illustrates the comparative flux density characteristics of thermal neutrons and fast neutrons as a function of distance from the level of bombardment without particular regard to the relative magnitudes which are shown more clearly in FIGS. 2–5. It can be seen that while the flux densities of both thermal and fast neutrons decrease with distance from the level of bombardment, the flux density of fast neutrons decreases at a considerably faster rate than the flux density of thermal neutrons.

These free neutrons in the formations react with the atoms of certain materials and produce artificially radioactive isotopes of those materials. The number of these radioactive isotopes, or radioisotopes, of a material in a given area is directly proportional to the flux density in that area of neutrons having energies such that they can react with the atoms of that material. Since the flux densities of neutrons having different energies vary differently with distance from the level of bombardment, the number of radioisotopes produced of each of two materials will also be different if the two materials react with neutrons having different energies. Therefore, the two curves of the graph of FIG. 1 also illustrate the variation with distance from the level of bombardment of the number of radioisotopes produced of two different materials where one reaction is induced by fast neutrons and the other is induced by thermal neutrons.

Returning to the example of the thermal neutron induced reaction involving $Al^{27}$ and the fast neutron (greater than 3.9 m.e.v.) induced reaction involving $Si^{28}$, it is possible, utilizing these principles, to determine the relative amounts of aluminum and silicon in the earth formations surrounding a bore. A knowledge of the amount of aluminum in the formations is important in oil well logging operations because it is indicative of shale formations which have a practically constant percentage of aluminum and help to determine the location of oil bearing strata.

When earth formations containing aluminum and silicon are bombarded by fast and thermal neutrons, the following reactions take place:

Thermal neutrons:

$$Al^{27} (n,\gamma) Al^{28} \xrightarrow[2.3 \text{ min.}]{\beta, \gamma} Si^{28} \qquad (1)$$

Fast neutrons:

$$Si^{28} (n,p) Al^{28} \xrightarrow[2.3 \text{ min.}]{\beta, \gamma} Si^{28} \qquad (2)$$

It should be noted that both reactions produce the radioisotope $Al^{28}$ and it is impossible, by ordinary methods, to distinguish between the gamma-ray activities associated with the two reactions. However, in accordance with the invention, the reactions are distinguished by obtaining the curves shown in FIG. 2 employing the apparatus shown in FIG. 1 as previously explained.

The curves shown in FIG. 2 illustrate the gamma-ray activity in counts per second measured by each of the gamma-ray detectors $D_1$ to $D_n$ as a function of time after the formations have been bombarded by fast neutrons. These curves illustrate the gamma-ray activities resulting from all reactions wherein gamma-rays are emitted, including those having half-lives other than 2.3 minutes. Since only the activity having a half-life of 2.3 minutes is desired, the activities having other half-life characteristics are removed by conventional means such as peeling off successive exponentials from the curves of FIG. 2 (which can be done electronically). The curves shown in FIG. 3 illustrate the 2.3 minute gamma-ray activity remaining after all other activities have been removed.

The amount of activity existing at an instant in time, for example, at the termination of bombardment, $t=0$, at each detector is taken from the curves shown in FIG. 3 and plotted (FIG. 4) as a function of distance from the level of bombardment. In FIG. 4, there is also schematized two theoretically calculated curves of the number of aluminum and silicon nuclei activated per sec. per unit volume per neutron per sec. emitted by a point source of 14 m.e.v. neutrons in an infinite medium having 15% porosity and 25% shale content. The silicon activity curve is plotted on a basis of energy integration over age theory and the aluminum activity curve is plotted on a basis of age theory followed by thermal diffusion. The positions of the two theoretically calculated curves will vary relative to each other in a vertical direction as the porosity of the formations varies. For example, if the formations are less porous the aluminum produced activity in the vicinity of the source will be depressed relative to that due to silicon because of the diminished local thermal neutron density. As a result, the curve representing the silicon activity will move upwardly relative to the curve representing the aluminum activity.

By comparing the theoretically calculated curves with the experimentally determined curve, it is possible to separate the gamma-ray activities involving aluminum and silicon. This separation may be accomplished by curve fitting techniques or it may be done electronically.

Once the two activities have been separated, a curve can be plotted, as shown in FIG. 5, for each activity. Since the scales are known, the amount of activity in counts per second can be determined for the aluminum reaction. By repeating this procedure at successive levels in the bore, a log of the aluminum content in the formations as a function of depth in the bore can be obtained. Even if the scales are not known, the location of shale formations can be determined by noting the variation of the aluminum content of the formations with depth in the bore.

When logging a bore in the manner just desscribed, it is preferred that the formations be bombarded with neutrons for approximately the half-life of the expected activity. The support 10 is then adjusted to a second level and the switch 20 closed and measurements taken for approximately the half-life of this activity. If desired, the neutron source may be disposed far enough away from the detectors so that it could be bombarding the next level in the bore while the detectors are measuring the activity at the former level. If the neutron source is disposed a relatively short distance from the detectors, means must then be provided for turning off or shielding the source while measurements are being made.

A further method of separating fast neutron induced activity from thermal neutron induced activity involves, as shown in FIG. 6, the use of a neutron source 30 and only one gamma-ray detector 31 and its associated count rate meter 32 and recorder 33. It is apparent from the curves of FIG. 5 that the fast neutron induced silicon activity falls off very rapidly with distance from the level of bombardment. At a sufficiently large distance, the fast neutron induced silicon activity is almost negligible in comparison with the thermal neutron induced aluminum activity. Therefore, by positioning the gamma-ray detector 31 at this distance (on the order of thirty inches for the point-source-in-infinite-medium case illustrated in FIG. 5) from the level of bombardment, the gamma-ray activity measured by this detector will be primarily the result of the thermal neutron induced aluminum activity and the fast neutron induced activity can be ignored. The optimum value for this distance can be obtained by standard mathematical computation or laboratory experiment. Of course, other activities having different half-life characteristics will still have to be separated from the measurements obtained in the manner previously described.

It should be understood that the application of this invention is not limited to reactions involving aluminum and silicon because a difference in spatial distribution will exist for any two radioisotopes if the induced activity is initiated by neutrons of different energies. For example, the principles of this invention could also be applied to the separation of the high energy neutron induced reaction $O^{16}(n,p)N^{16}$ having a half-life of 7.3 seconds from the thermal neutron induced reaction $N^{15}(n,\gamma)N^{16}$ producing the same isotope with the same half-life. The principles of the invention can also be employed where, instead of exactly the same isotope being produced by two reactions, two different isotopes are produced but have approximately the same half-life characteristics so that it is difficult to separate them.

While representative embodiments of the present invention have been shown and described for purposes of illustration, it is apparent that the embodiments are susceptible of change and modification without departing from the invention in its broader aspects. Therefore, the invention described herein is not to be construed as limited to the specfic embodiments described but is intended to encompass all modifications thereof coming within the scope of the following claims.

I claim:
1. A method of logging earth formations traversed by a bore, the formations including at least a first element that is susceptible of induced radioactivity in response to interaction with relatively low energy neutrons to produce radioactive products and a second element that is susceptible of induced radioactivity in response to interaction with relatively high energy neutrons to produce radioactive products, said radioactive products of each of said first and second elements having substantially the same half-lives, said method comprising the steps of bombarding for a predetermined interval the formations adjacent a first level in the bore with neutrons of relatively high energies; during a second predetermined interval subsequent to said interval of bombardment, continuously measuring, simultaneously at a plurality of levels in said bore spaced longitudinally with respect to the axis of said bore from said first level of bombardment, the gamma-ray activity resulting from the decay of the radioactive products of said first and second elements produced as a result of said bombardment; and recording successive indications representative of said gamma-ray activity as a function of time measured at each of said plurality of levels after termination of said bombardment to enable a determination of the relative quantities of said first and second elements in said formations.

2. A method of logging earth formations traversed by a bore, the formations including at least a first element that is susceptible of induced radioactivity by capture of relatively low energy neutrons during neutron bombardment to produce radioactive products and a second element that is susceptible of induced radioactivity in response to the capture of relatively high energy neutrons during neutron bombardment to produce radioactive products, said radioactive products resulting from the bombarding of each of said first and second elements having substantially the same half-lives, said method comprising the steps of bombarding the formations adjacent a first level in the bore with neutrons of relatively high energies for a substantial fraction of the half-life of the expected activity; during a substantial fraction of the half-life of the expected activity subsequent to said bombardment, continuously measuring, simultaneously at a plurality of levels in said bore spaced apart longitudinally with respect to the axis of said bore from said first level of bombardment, the intensity of the gamma-ray activtiy resulting from the decay of the radioactive products produced during said bombardment; and recording successive indications representative of said gamma-ray activity as a function of time for each of said plurality of levels to enable a determination of the relative quantities of said first and second elements in said formations.

3. A method of logging earth formations traversed by a bore, the formations including at least a first element that is susceptible of induced radioactivtiy by capture of relatively low energy neutrons to produce radioisotopes having a given half-life and a second element that is susceptible of induced radioactivity involving an n,p reaction in response to relatively high energy neutrons to produce radioisotopes having substantially the same half-life as said given half-life, said method comprising the steps of disposing in the bore a support having mounted thereon a source of at least relatively high energy neutrons and a plurality of gamma-ray detectors spaced apart longitudinally with respect to each other and said source, bombarding said formations with neutrons from said source at a first level in said bore, turning off the bombardment at said first level and during a predetermined interval subsequent to said bombardment continuousuly measuring simultaneously with said plurality of detectors the gamma-ray activity resulting from the decay of the radioisotopes created by said bombardment, and recording a plurality of curves representing said gamma-ray activity as a function of time as measured by each of said detectors to enable a determination of the relative amounts of said first and second elements in said formations.

4. Apparatus for logging earth formations traversed by a bore, the formations including at least a first element that is susceptible of induced radioactivity in response to interaction with relatively low energy neutrons to produce radioactive products and a second element that is susceptible of induced radioactivity in response to interaction with relatively high energy neutrons to produce radioactive products, said radioactive products of said first and second elements having substantially the same half-lives, said apparatus comprising a support adapted to be disposed in said bore, a source of at least relatively high energy neutrons for bombarding adjacent earth formations with relatively high energy neutrons, a plurality of simultaneously operative gamma-ray detectors mounted on said support in longitudinally spaced apart relation with respect to each other and said source, and separate means acting in response to each of said gamma-ray detectors for providing a record of the gamma-ray activity measured by each of said detectors as a function of time which records enable a determination of the relative quantities of said first and second elements in said formations.

5. Apparatus for logging earth formations traversed by a bore, the formations including at least a first element that is susceptible of induced radioactvity by capture of relatively low energy neutrons during neutron bombardment to produce radioactive products and a second element that is susceptible of induced radioactivity involving an n,p reaction in response to relatively high energy neutrons during neutron bombardment to produce radioactive products, said radioactive products resulting from the bombardment of said first and second elements having substantially the same half-lives, said apparatus comprising a support adapted to be lowered into said bore, a source of at least relatively high energy neutrons for bombarding adjacent earth formations with relatively high energy neutrons, a plurality of simultaneously operative gamma-ray detectors mounted on said support in longitudinally spaced apart relation with respect to said source and each other and responsive to the gamma radiation from said radioactive products, a plurality of count rate meters respectively connected to said plurality of gamma-ray detectors, and means responsive to the outputs of said count rate meters to provide individual records of the gamma ray activity as a function of time measured by each of said gamma ray detectors, to enable a determination of the relative amounts of said first and second elements in said formations.

6. A method of logging earth formations traversed by a bore, the formations including a plurality of elements that are susceptible of induced radioactivity by bombardment with neutrons, the plurality of elements including a first element that is susceptible of induced radioactivity in response to relatively high energy neutrons to produce a radioisotope having a given half-life during which decay is evidenced by the emission of gamma rays and a second element that is susceptible of induced radioactivity in response to relatively low energy neutrons to produce a radioisotope having a half-life of a duration substantially equal to that of said given half-life during which decay is evidenced by the emission of gamma rays, said method comprising the steps of disposing in the bore a support having mounted thereon a source of at least relatively high energy neutrons and a plurality of gamma ray detectors spaced apart longitudinally with respect to each other and said source, bombarding said formations with neutrons from said source at a level in said bore for a substantial portion of the half-life of the induced radioactivity of said first and second elements, measuring with said plurality of detectors the gamma ray activity resulting from the decay of the radioisotopes produced by said neutron bombardment, said measurement being for substantially the half-life of the induced radioactivity of said first and second elements, plotting a first plurality of curves representing said gamma ray activity as measured by each of said detectors, as a function of time, removing from said first plurality of curves all activities other than the activities involving said first and second elements and plotting a second plurality of curves representing only the activities involving said first and second elements, and plotting a single curve representing the gamma ray activity as a function of distance from said level of bombardment at a predetermined time, the values of said gamma ray activity being obtained from said second plurality of curves, said single curve enabling a determination of the relative quantities of said first and second elements in said formations.

7. Apparatus for logging earth formations traversed by a bore, the formations including at least a first element that is susceptible of induced radioactivity in response to interaction with relatively low energy neutrons to produce radioactive products of a given half-life which emit gamma rays during decay and a second element that is susceptible of induced radioactivity in response to interaction with relatively high energy neutrons to produce radioactive products having a half-life of a duration substantially equal to said given half-life which emit gamma rays during decay, said apparatus comprising a support adapted to be disposed in said bore, a source of at least relatively high energy neutrons for irradiating the formations, at least one gamma-ray detector mounted on said support in longitudinally spaced apart relation with respect to said source, said detector being located in the bore while in operation far enough away from the position of said neutron source during the irradiation that the neutrons inducing radioactivity detected by said detector are primarily low energy neutrons and means acting in response to said detector for providing a record of the decay in gamma-ray activity measured at such location by said detector as a function of time.

8. A method of logging earth formations traversed by a bore, the formations including at least a first element that is susceptible of induced radioactivity in response to interaction with relatively low energy neutrons to produce radioactive products of a given half-life which emit gamma-rays during decay and a second element that is susceptible of induced radioactivity in response to interaction with relatively high energy neutrons to produce radioactive products having a half-life of a duration substantially equal to said given half-life which emit gamma-rays during decay, said method comprising the steps of disposing a source of at least high energy neutrons at a level of bombardment in said bore and bombarding the formations with neutrons, subsequent to said bombardment, detecting at another level the gamma-ray activity resulting from the decay of said radioactive products produced by said bombardment, said other level being spaced far enough from said level of bombardment so that the neutrons inducing the detected gamma-ray activity are primarily relatively low energy neutrons and recording indications representative of said gamma-ray activity as a function of time, 9. A method of detecting the presence of aluminum in earth formations traversed by a bore, comprising the steps of bombarding for a predetermined period the formations adjacent a first level in the bore with neutrons of relatively high energies, detecting the decay of gamma radiation over an interval on the order of 2.3 minutes at least at a second level in said bore spaced longitudinally with respect to the axis of said bore from said first level at a location beyond any substantial fast neutron induced silicon activity but in the range of thermal neutron induced activity resulting from the high energy neutron bombardment, said detecting interval commencing substantially immediately after neutron bombardment in the vicinity of said levels is terminated, and recording successive indications representative of the gamma radiation detected at said second level as a function of time during such interval to enable a determination of the presence of aluminum in said formations.

10. Apparatus for detecting the presence of aluminum in earth formations traversed by a bore, said formations containing both silicon and aluminum, comprising, a support adapted to be disposed in said bore, a source of 14 m.e.v. neutrons mounted on said support and adapted to irradiate said formations for a predetermined interval, at least one gamma-ray detector mounted on said support and spaced longitudinally from said neutron source at a location beyond any substantial fast-neutron-induced silicon activity but in the range of thermal-neutron-induced aluminum activity resulting from irradiation by said source, and means acting in response to said one detector for providing a record of the gamma-ray activity measured by said detector at said location in the bore as a function of time during an interval on the order of 2.3 minutes commencing substantially immediately upon termination of said predetermined interval of irradiation.

References Cited in the file of this patent

UNITED STATES PATENTS

| | | |
|---|---|---|
| 2,285,840 | Scherbatskoy | June 9, 1942 |
| 2,469,462 | Russell | May 10, 1949 |
| 2,508,772 | Pontecorvo | May 23, 1950 |
| 2,515,501 | Fearon et al. | July 18, 1950 |
| 2,665,385 | Herzog | Jan. 5, 1954 |
| 2,752,504 | McKay | June 26, 1956 |
| 2,760,079 | Arps | Aug. 21, 1956 |
| 2,776,378 | Youmans | Jan. 1, 1957 |
| 2,963,587 | Richard | Dec. 6, 1960 |
| 2,965,757 | Martin et al. | Dec. 20, 1960 |
| 2,971,094 | Tittle | Feb. 7, 1961 |
| 3,035,174 | Turner et al. | May 15, 1962 |